US012706354B2

(12) United States Patent
Villa et al.

(10) Patent No.: US 12,706,354 B2
(45) Date of Patent: Aug. 11, 2026

(54) COUPLING DEVICE FOR COUPLING TAB ELECTRIC TERMINALS OF BATTERY CELLS

(71) Applicant: A. AGRATI S.P.A., Veduggio con Colzano (IT)

(72) Inventors: Matteo Villa, Veduggio con Colzano MB (IT); Antonio Confalonieri, Veduggio con Colzano (IT); Davide Ornaghi, Veduggio con Colzano (IT)

(73) Assignee: A. AGRATI S.P.A., Veduggio con Colzano (IT)

( * ) Notice: Subject to any disclaimer, the term of this patent is extended or adjusted under 35 U.S.C. 154(b) by 593 days.

(21) Appl. No.: 18/257,856

(22) PCT Filed: Dec. 14, 2021

(86) PCT No.: PCT/IB2021/061693
§ 371 (c)(1),
(2) Date: Jun. 15, 2023

(87) PCT Pub. No.: WO2022/144658
PCT Pub. Date: Jul. 7, 2022

(65) Prior Publication Data

US 2024/0072384 A1 Feb. 29, 2024

(30) Foreign Application Priority Data

Dec. 28, 2020 (IT) ........................ 102020000032474
Dec. 28, 2020 (IT) ........................ 102020000032480

(51) Int. Cl.
*H01M 50/517* (2021.01)
*H01M 50/503* (2021.01)
(Continued)

(52) U.S. Cl.
CPC ....... *H01M 50/517* (2021.01); *H01M 50/503* (2021.01); *H01M 50/557* (2021.01); *H01M 50/567* (2021.01)

(58) Field of Classification Search
CPC ............. H01M 50/517; H01M 50/503; H01M 50/557; H01M 50/567; H01M 50/521; H01M 50/553
See application file for complete search history.

(56) References Cited

U.S. PATENT DOCUMENTS 1,059,326 A * 4/1913 Ackermann ......... H01R 13/523 429/1
1,420,435 A * 6/1922 Marko ................ H01M 50/522 439/760
(Continued)

FOREIGN PATENT DOCUMENTS

DE 102010052507 A1 5/2012
FR 3060874 A1 6/2018
(Continued)

OTHER PUBLICATIONS

Foreign Communication from a Related Counterpart Application, International Search Report and Written Opinion dated Apr. 4, 2022, International Application No. PCT/IB2021/061693 filed on Dec. 14, 2021.

*Primary Examiner* — Truc T Nguyen
(74) *Attorney, Agent, or Firm* — Conley Rose, P.C

(57) ABSTRACT

The present disclosure relates to a coupling device for coupling two or more tab electric terminals of distinct battery cells. A pair of U-shaped jaws retains the terminals therebetween with the electrical contact surfaces facing each other. A clamping element is configured to clamp the jaws towards each other in the first direction. During the clamping, an inclined wedge surface converts the pressure in the first direction to a pressure on the terminals in a second
(Continued)

direction, so as to establish a reliable electrical contact between the terminals, direct or with the interposition of a spacing block. Wedge surfaces can be provided laterally, for example in the arms of the jaws, or between distinct bodies forming a spacing block between the terminals.

12 Claims, 7 Drawing Sheets

(51) Int. Cl.
*H01M 50/557* (2021.01)
*H01M 50/567* (2021.01)

(56) References Cited

U.S. PATENT DOCUMENTS 1,507,936 A * 9/1924 Schmitt ................ H01R 11/283 439/771
1,542,680 A * 6/1925 Eberling .............. H01R 11/281 439/756
1,654,838 A * 1/1928 Schroeder ................ H01R 4/44 439/781
1,680,201 A * 8/1928 Bihl ..................... H01R 11/286 439/519
1,801,282 A * 4/1931 Mclean ............... H01M 50/571 439/522
4,857,020 A * 8/1989 Crosby ................ H01R 4/5091 439/783
5,547,403 A * 8/1996 Haberstroh .......... H01R 11/283 439/763
8,033,875 B1 * 10/2011 Maguire .................. H01R 4/38 439/762
11,749,914 B2 * 9/2023 Jushchyshyn ............ H01R 4/38 439/807
12,555,837 B2 * 2/2026 Kotter ...................... G01B 7/18
2002/0142674 A1 * 10/2002 Chadbourne ........ H01R 4/5083 439/783
2006/0105624 A1 * 5/2006 Yoshikane .......... H01M 50/517 439/500
2010/0104927 A1 * 4/2010 Albright ................. B60L 50/64 429/50
2013/0115489 A1 5/2013 Krause et al.
2014/0113506 A1 * 4/2014 Jones ................... G01R 31/388 439/761
2018/0123096 A1 * 5/2018 McCarty ............. H01M 50/264
2019/0260005 A1 * 8/2019 Smith ................. H01M 50/505
2019/0296310 A1 * 9/2019 Newman ............. H01M 50/516
2020/0403329 A1 * 12/2020 Durse .................... H01R 11/09
2023/0369789 A1 * 11/2023 Hemphill ............. H01R 11/287
2023/0411874 A1 * 12/2023 Trautmann .......... H01M 50/517
2024/0322390 A1 * 9/2024 Cho .................. H01M 10/6554

FOREIGN PATENT DOCUMENTS

KR 101366118 B1 2/2014
WO 2022144658 A1 7/2022

* cited by examiner

COUPLING DEVICE FOR COUPLING TAB ELECTRIC TERMINALS OF BATTERY CELLS

CROSS-REFERENCE TO RELATED APPLICATIONS

The present application is a filing under 35 U.S.C. 371 as the National Stage of International Application No. PCT/IB2021/061693, filed Dec. 14, 2021, entitled "COUPLING DEVICE FOR COUPLING TAB ELECTRIC TERMINALS OF BATTERY CELLS," which claims priority to Italian Application No. 102020000032474 filed with the Intellectual Property Office of Italy on Dec. 28, 2020, and Italian Application No. 102020000032480 filed with the Intellectual Property Office of Italy on Dec. 28, 2020, all of which are incorporated herein by reference in their entirety for all purposes.

TECHNICAL FIELD

The present invention develops in the technical field of connections between electric terminals. In more detail, the invention relates to a coupling device particularly adapted to mechanically and electrically couple tab electric terminals such as those typically present in various types of battery cells.

BACKGROUND ART

The connection points between electric terminals in some applications play an important role in ensuring a high reliability and efficiency of an electrical system.

For example, inside a vehicle it is essential to ensure the mechanical stability of the electrical joints, to avoid accidental disconnections due to vibrations.

The quality of the electrical contact is also important, and in particular that the contact resistance is minimized. In fact, where operating currents are particularly high, even a small voltage drop due to the electrical resistance of a junction can cause a significant loss of efficiency, as well as a dangerous localized heating.

Accordingly, connections between battery cells within a battery module for applications in electric or hybrid vehicles are particularly sensitive.

In the sector, the term battery pack refers to the entire main assembly of accumulation elements present in the vehicle. The battery pack contains one or more pre-assembled battery modules, which can be connected to each other in series or in parallel. Each battery module in turn encloses a plurality of battery cells.

The cell is a single block formed by those elements which are indispensable for the development of electrochemical reactions which allow the accumulation of energy. Such elements include two electrodes, i.e., the anode and the cathode of the cell, respectively, an interface electrolyte between the electrodes, a casing containing the electrodes and the electrolyte, and electric terminals which are connected to the electrodes and partially emerge outside the casing.

Depending on the arrangement of the components of a cell, and in particular the shape of the casing, different types of battery cells are distinguished, including pouch cells, prismatic cells and cylindrical cells.

Each cell offers a rather low electrical potential, so inside a battery module the cells are connected mainly in series, without necessarily excluding parallel connections. In a series connection, the positive terminal of a cell must be connected to the negative terminal of the adjacent cell. Parallel connections can involve multiple terminals of the same or different polarities.

The terminals of the battery cells can be made in various forms. One example is screw terminals, i.e., terminals with a threaded conductive stem emerging outside the casing. A known example of a screw terminal connection is a lamina busbar with two holes. The two screw terminals to be connected each extend through a respective busbar hole, perpendicular to the lamina of the busbar. A nut is tightened against the busbar by virtue of the thread of the screw terminal, ensuring the electrical connection.

Another example is tab terminals, i.e., conductive lamina with a surface extension which prevails to the thickness. Couples of tab terminals are usually welded together, directly, or are welded to a common busbar which acts as a spacer between the two terminals.

A direct welding between two tab terminals can be accomplished by crimping, i.e., a complementary mechanical deformation whereby a portion of one tab permanently penetrates into a recess of the other. An example instead of welding to a busbar is laser welding, which involves localized heating, with partial fusion of the contact surfaces between busbar and tab.

Problems of the Prior Art

The described solutions are defective in some respects related to reliability and contact resistance. For example, in the case of screw terminals a significant portion of current must pass from the screw to the nut and from the nut to the busbar, with two physical separations, with a limited surface, which cause an increase in resistance. Furthermore, continuous vibrations cam loosen the contact and further increase the resistance.

Crimping does not ensure good contact quality for the entire potentially available surface of the tab terminal, and it also suffers from vibration.

Laser welding creates a relatively low resistance connection, but only at the welding areas reached by the laser, and not for the entire surface of the tab. Furthermore, the connection is good and is mechanically stable only as long as the localized fusion allows a good alloy to be formed between the material of the tab and of the busbar.

This condition does not occur in all battery cells. This is due to the fact that the positive and negative terminals, as well as the busbar, in order to obtain high performance, are usually formed with different metals, with low impurities. Therefore, they have different melting points, which complicate, at the level of the production process, the formation of an alloy of the desired quality. The presence of impurities also hinders the formation of a good alloy.

A further problem is related to the irreversibility of the connections between the described tab terminals, which hinders subsequent maintenance.

SUMMARY OF THE INVENTION

The object of the present invention is to allow a mechanically stable and low-resistance connection between tab electric terminals, particularly battery cell terminals.

It is also an object of the invention to reversibly couple tab terminals to each other.

This and other objects are achieved by a coupling device for coupling tab electric terminals, and by a battery module, according to any of the appended claims.

In particular, the coupling device includes two jaws, facing each other, between which the tab terminals to be connected are arranged. The two jaws are clamped together in a first direction, although the contact surfaces of the tab terminals are facing each other in another, second direction, transverse to the first one.

One or more wedge surfaces are included in the area between the two jaw bases. Wedge surfaces can for example be formed in side arms of U- or L-shaped jaws. Alternatively, the wedge surfaces can be part of other components which are compressed by the jaws in the first direction. In any case, the wedge surfaces are arranged so as to convert the pressure in the first direction, developed by the jaws, into a pressure in the second direction.

By virtue of this second pressure, the contact surfaces of the tab terminals can be pressed against each other, directly or with the interposition of a busbar which acts as a spacer. Alternatively, the pressure in the second direction can also be in a direction for mutually distancing the tab terminals. This pressure can also favour electrical contact, for example when complementary wedge surfaces are formed in two pieces of the busbar. Therefore, the displacement pressure results in appropriate contact pressures between each tab terminal and the various parts of the busbar. Excessive displacements with loss of contact are prevented by side elements such as jaw arms.

The pressure in the second direction causes the electrical contact to exploit the entire available surface of the tab terminal. Furthermore, even in the event of strong vibrations tending to detach the various electrical contact surfaces, the elasticity of the system and the operating principle of the clamped wedge surfaces immediately recreates the desired contact pressure, ensuring stability.

Further features and advantages of the invention will be recognized by those skilled in the art from the following detailed description of exemplary embodiments of the invention.

BRIEF DESCRIPTION OF THE FIGURES

The accompanying figures schematically show, by way of non-limiting example, useful examples for understanding some embodiments of the invention, and in particular.

DETAILED DESCRIPTION

Figure 1:
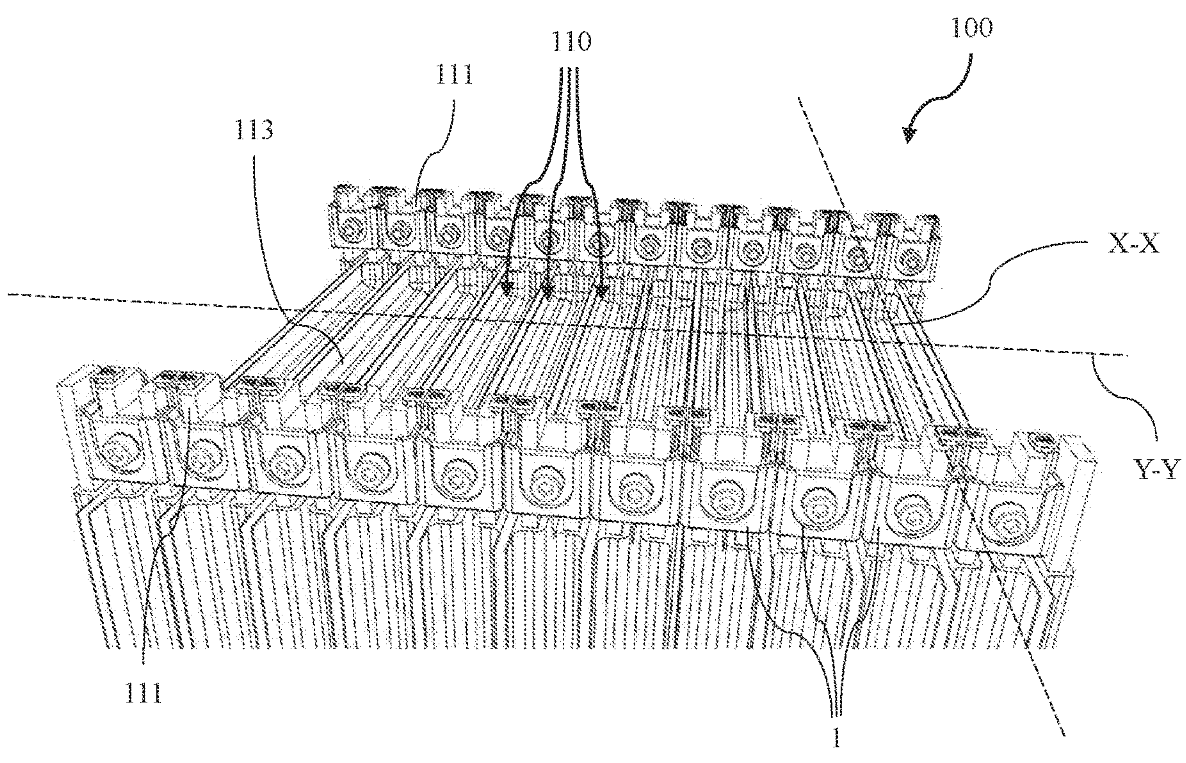
FIG. 1 shows a partial perspective view of a battery module containing various coupling devices for tab electric terminals according to an embodiment of the invention.
Figure 2:
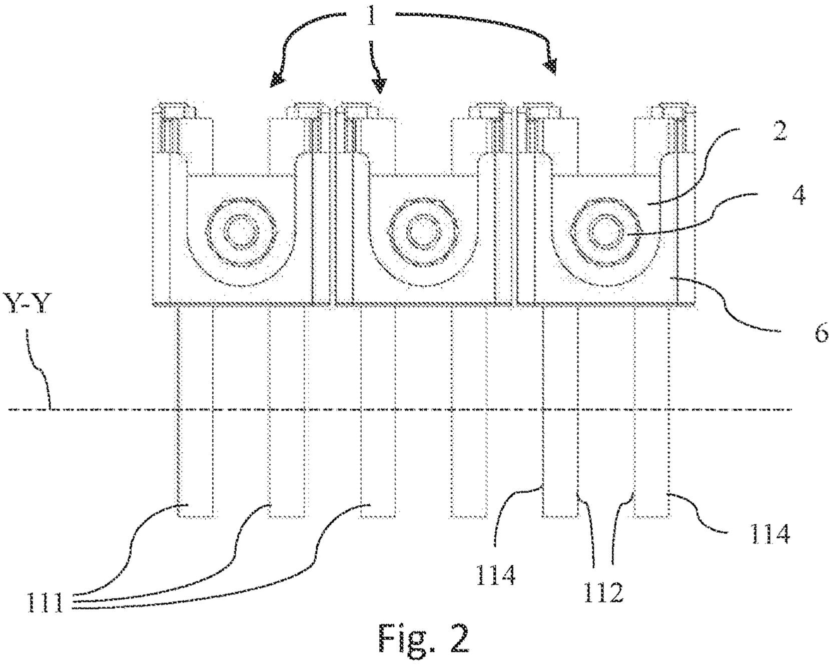
FIG. 2 shows a front view of some of the coupling devices of FIG. 1, assembled on respective terminal pairs.

The different embodiments illustrated in the figures contain variants of a coupling device for coupling two or more tab electric terminals. A number of aspects of the invention are common to all of these embodiments.

In summary, some of the aspects common to the various embodiments, which are further explored below, are given by the fact that the device comprises a pair of jaws spaced apart from each other in a first direction, each jaw having a base. The bases of the jaws delimit in the first direction a seat therebetween, the seat being adapted to receive therein two or more tab electric terminals, so that respective electrical contact surfaces of the terminals face each other in a second direction, transverse to the first direction. Side elements of the device are spaced apart from each other in the second direction, and are positioned so as to delimit the seat in the second direction and retain the terminals therebetween. A clamping element of the device is configured to clamp the jaws towards each other in the first direction. At least one wedge surface of the device is inclined with respect to the first and second directions, and is formed, with respect to the first direction, between the jaw bases. The wedge surface is arranged so as to convert a pressure in the first direction, exerted by clamping the pair of jaws, into a pressure in the second direction on the terminals, when present in the seat.

In addition to the common aspects, the features which will be described with reference to a specification of the illustrated embodiments, except for obvious technical incompatibilities or explicit indications to the contrary, shall be understood as interchangeable, or applicable to any of the other embodiments.

In greater detail, a battery module is indicated as a whole with the reference numeral 100.

The battery module 100 comprises a casing (not shown).

The module 100 also comprises a plurality of battery cells 110, contained in the casing. The preferred cells 110 are pouch-type cells.

Each cell 110 comprises a pair of tab electric terminals 111, preferably spaced apart in a first direction X-X.

The tab terminals 111 are made in the form of a lamina, preferably planar, perpendicular to a second direction Y-Y. The second direction Y-Y is transverse, preferably perpendicular, to the first direction.

Each terminal 111 has two opposite faces.

The cells 110 are arranged such that pairs of tab terminals 111 of different cells 110 are aligned with each other in the second direction Y-Y and have respective contact surfaces 112 facing each other in the second direction Y-Y. The cells 110 in particular are aligned in the second direction X-X.

Each contact surface 112 identifies one of the faces of the terminal 111. As will be detailed below, the contact surfaces

112 of a pair of terminals 111 to be connected can face, and be in contact, with each other, or face, and be spaced apart from, each other.

Each cell 110 further comprises its own casing 113, and the terminals 111 protrude from the casing 113 of the cell 110.

As is known, each battery cell 110 then comprises electrodes (not shown), inside the casing and electrically connected to the terminals 111, and an electrolyte (not shown) inside the casing and interposed between the electrodes.

The battery module 100 comprises at least one coupling device 1, preferably a plurality of coupling devices 1 for two or more tab electric terminals 111 of the battery cells 110. For example, a single pair of terminals 111, or a group of terminals 111 consisting of more than two terminals 111, can be connected.

Those skilled in the art will understand that the coupling device 1 can also be provided separately from the battery module 100, and can also be used to connect tab electric terminals 111 of other types of devices without correlation with the battery sector.

The coupling device 1 is aimed at the mechanical coupling of the terminals 111, so that they are in electrical contact with each other.

The coupling device 1 can also directly perform electrical coupling functions between the terminals 111, in preferred embodiments to be illustrated, in which the terminals 111 are not in direct contact with each other, but with the interposition of some conductive elements of the coupling device 1.

The device 1 comprises a pair of jaws 2, spaced from each other in the first direction X-X. As will be seen below, the jaws 2 are connected to each other at least indirectly, with the possibility of some mutual movements.

Each jaw 2 has a base 21. The bases 21 of the jaws 2 are spaced apart and face each other in the first direction X-X. Each base 21 is also arranged transverse to the first direction X-X. Thus the jaws 2 delimit a seat, formed between the jaws 2. In detail, the seat is delimited in the first direction X-X by the bases 21 of the jaws 2.

The device 1 further comprises side elements 22, spaced apart from each other in the second direction Y-Y. The side elements 22 are positioned so as to delimit the seat in the second direction Y-Y.

The side elements 22 can be integrally formed with at least one of the jaws 2, or they can be connected directly or indirectly to the jaws 2. Thus the side elements 22 are connected at least indirectly also to each other. In some embodiments, a certain degree of movement of the side elements 22 with respect to each other is allowed.

In the preferred embodiments, each side element 22 is identified by an arm of one of the jaws 2. Therefore, the side elements 22 are integrally formed with the jaws 2. Precisely, each jaw 2 has at least one arm, preferably two arms, connected to respective opposite end portions of the base 21 of the jaw 2.

Given the identity, at least in some embodiments, between the arms of the jaws 2 and the side elements 22, the arms can also be indicated below with the reference numeral 22.

The arms of each jaw 2 extend at least in part in the first direction X-X from the respective base 21 towards the opposite jaw 2. Preferably, each arm 21 mainly extends in a direction which forms an angle with the first direction X-X not exceeding 45°.

In the case of a single arm per jaw 2, the jaw 2 can be L-shaped. In the case of a pair of arms per jaw 2, the jaw 2 can be U-shaped, with the two arms of each jaw 2 spaced apart in the second direction Y-Y.

In order for the seat to be delimited in the second direction Y-Y on both sides, it is possible for example that both jaws 2 are U-shaped, or both are L-shaped, with the single arm of each jaw 2 spaced in the second direction Y-Y from the arm of the opposite jaw 2.

Mixed configurations are also conceivable, in which one of the side elements 22, on one side of the seat, is represented by an arm of an L-shaped jaw 2, while the side element 22 on the opposite side of the seat is a member independent of the jaws 2, or in which both side elements are arms of a single U-shaped jaw 2, while the other jaw 2 lacks arms.

The seat is shaped to receive two or more tab electric terminals 111 to be connected therein. In particular, the terminals 111 are insertable in the seat along a direction perpendicular to the first direction X-X and the second direction Y-Y. The connection of the side elements 22 is such that they are able to retain the terminals 111 in the seat between each other.

In an assembled condition, each terminal 111 has at least one face, which identifies a contact surface 112, oriented toward another terminal 111. Face 114, which is opposite the commented contact surface 112, can in turn be a contact surface 112, oriented toward yet another terminal 111, or can be oriented toward at least one of the side elements 22 delimiting the seat. In preferred embodiments, the coupling device 1 comprises at least one spacing block 3, or busbar, made of an electrically conductive material. A single spacing block 3 is sufficient if there are two terminals 111 to be connected, while for a greater number of terminals 111 more spacing blocks 3 are preferable.

Each spacing block 3 is arranged in the seat between the jaws 2. The spacing block 3 has two opposite abutment surfaces 31. The abutment surfaces 31 are transverse to the second direction Y-Y and are spaced apart from each other in the second direction Y-Y.

The spacing blocks 3 divide the seat into compartments, for example two compartments, each intended to receive a respective terminal 111. The compartments are spaced apart from each other in the second direction Y-Y. The abutment surfaces 31 of each spacing block 3 each face a different compartment.

In an assembled condition, i.e., when the terminals 111 are inserted in the seat and are coupled to each other by the device 1, the abutment surfaces 31 of each spacing block 3 each face, and is in contact with, the contact surface 112 of a respective terminal 111.

Alternatively, the contact surfaces 112 of the terminals 111 in the seat can be in direct contact with each other, without any spacing block 3 being included.

If present, each spacing block 3 preferably also has opposite secondary surfaces 32. The secondary surfaces 32 are transverse to the first direction X-X and spaced from each other in the first direction X-X. The secondary surfaces 32 each face the base 21 of a respective jaw 2, optionally in mutual contact.

The jaws 2 are movable with respect to one another in the first direction X-X. In fact, the device 1 comprises at least one clamping element 4 configured to clamp the jaws 2 towards one another in the first direction X-X.

Preferably, the jaws 2 are connected to each other by means of the clamping element 4. In detail, the clamping element 4 comprises a stem 41 extending along the first direction X-X.

In the illustrated embodiment, the stem 41 is at least partly threaded, and is part of a screw which also comprises a head 42.

The clamping element 4 can also comprise a threaded element, for example a nut 43, screwable on the stem 41 to clamp the jaws 2 together. The jaws 2 are interposed between the head 42 of the screw and the nut 43, so as to be clampable therebetween. As an alternative to the nut 43, a clamping hole 23 of at least one jaw 2, discussed below, can be threaded to allow the clamping. In yet another variation, the threaded stem 41 can be headless, while the head 42 can be replaced by a further nut 43 or other threaded element, so as to have, for example, two nuts 43 clamped at the two end portions of the stem 41.

Finally, pairs of washers 44 fitted on the stem on opposite sides of the device 1 are illustrated, although in principle a single washer 44, or washers 44 on a single side, can be included. Preferably, each washer 44 is a conical washer, i.e., a cup spring. Each washer 44 is placed between a jaw 2 and a part of the clamping element 4, such as the head 42 of the screw or a nut 43. The concavity of the conical washer 44 faces the jaw 2.

The washers 44 can represent a preferred embodiment of an elastic element, such as to ensure a limited clearance of movement of the jaws 2 with respect to the screw and the nut 43, even when clamped. This makes the electrical connection more stable even in case of vibrations. Further elasticity can be conferred on the device by an appropriate design of the jaws 2. In particular, the jaws 2 are preferably made of a metal with elastic features, such as steel. Moreover, the thickness of the bases 21 in the first direction X-X is selected so as to ensure the desired elastic reaction force to compensate for the vibrations.

In the illustrated embodiments, each jaw 2 comprises a clamping hole 23, crossed by the stem 41. The clamping hole 23 is preferably formed in the base 21 of the respective jaw 2. Preferably, also the spacing block 3 is connected to the jaws 2 by the clamping element 4.

In detail, the spacing block 3 has a clamping hole 33. The stem 41 of the clamping element 4 also extends through the clamping hole 33 of the spacing block 3, as well as through the clamping holes 23 of the jaws 2.

Figures 3, 4, 5:
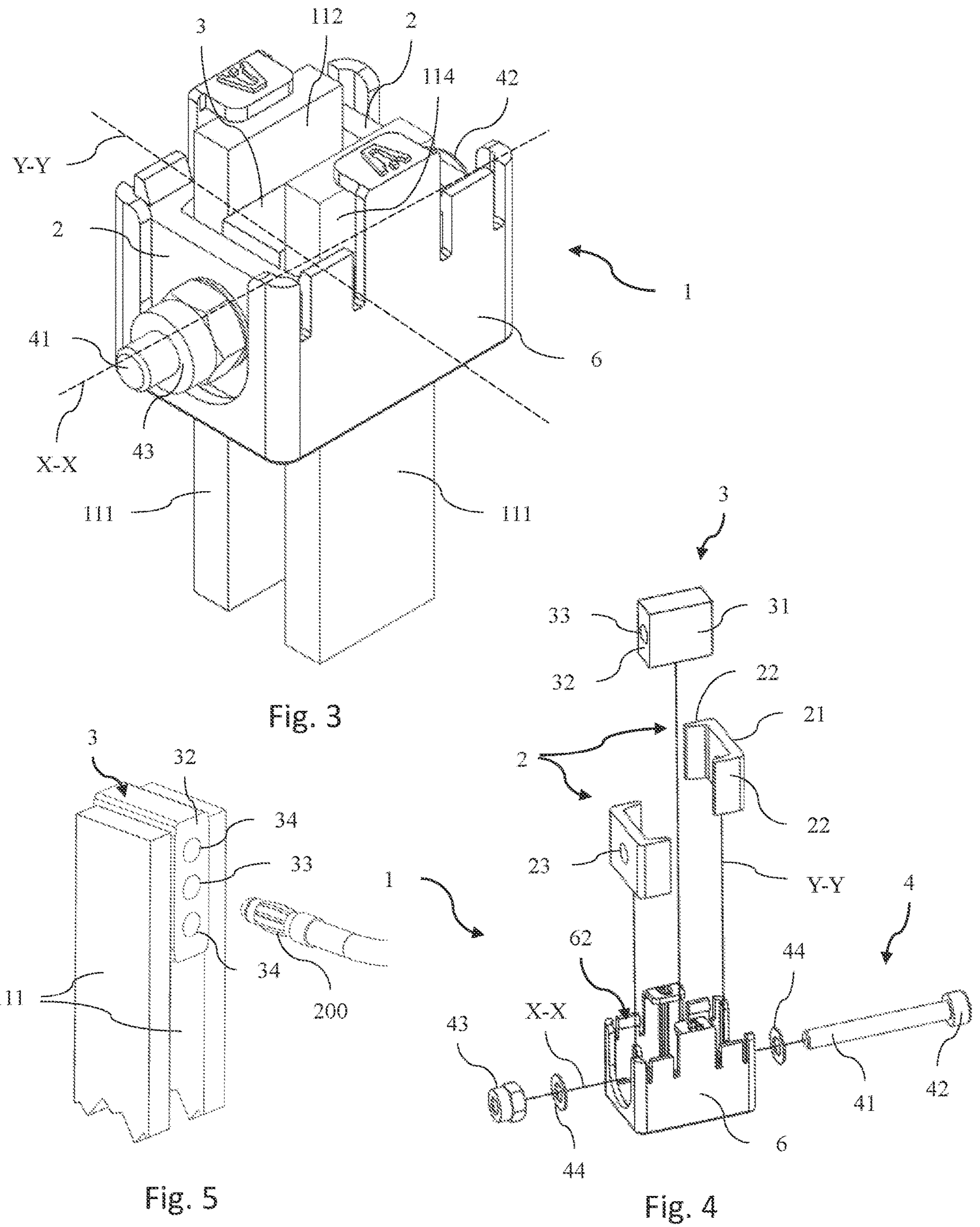
FIG. 3 shows a perspective view of one of the coupling devices of FIG. 1, assembled on a pair of terminals.
FIG. 4 shows a perspective exploded view of the components of the coupling device of FIG. 3.
FIG. 5 shows an alternative embodiment of a spacing block for the coupling device of FIG. 3, and a connector connectable to the spacing block.

In the embodiment of FIG. 5, the spacing block 3 has also at least one connection hole 34, preferably independent of the possible clamping hole 33.

The connection hole 34 is configured for the electrical connection with a male connector 200 of at least one external electrical device (not shown).

The connection with external devices allows for example the measurement of voltage or temperature, which are shared between the spacing block 3 and the tab terminals 111, or the exchange of current.

However, the connection hole 34 is only an embodiment example of a possible connection element, for the electrical connection with the external electrical device. For example, the spacing block 3 can include a faston terminal.

It is preferred that the connection elements are formed in the spacing block 3, since this shares the temperature and the electrical potential with the terminals 111. However, connection elements can also be formed in other components of the device 1, such as the jaws 2, if they are made of electrically and/or thermally conductive materials.

According to the invention, at least one wedge surface 5 is present in the coupling device 1.

Each wedge surface 5 can be formed in a special wedge element, or in other elements of the coupling device 1, for example in one or more of the jaws 2, or in the spacing block 3.

Each wedge surface 5 is positioned, considering the first direction X-X, between the positions in the first direction X-X of the bases 21 of the two jaws 2. In more detail, each wedge surface 5 can be inside the seat between the jaws 2, or it can be part of one of the elements delimiting the seat, such as the side elements 22, for example given by the arms of the jaws 2.

Although it is possible to obtain coupling devices 1 according to the invention with a single wedge surface 5, including more than one wedge surface 5, for example two or four suitably arranged wedge surfaces 5, allows a better and more symmetrical distribution of the forces in the coupling device, as will be evident from the following. A greater number of wedge surfaces 5 is particularly preferable if the connection of numerous terminals 111 with a single device 1 is required.

Various aspects of one wedge surface 5 will therefore be described, which are in any case to be understood as applicable to each thereof.

The wedge surface 5 is inclined with respect to the first and second directions X-X, Y-Y.

The wedge surface 5 is arranged so as to convert a pressure in the first direction X-X, exerted by clamping the pair of jaws 2, into a pressure in the second direction Y-Y.

Those skilled in the art will understand how different inclinations of the wedge surface 5 with respect to the first and second directions X-X, Y-Y allow to adjust a ratio between the pressures in the first and second direction Y-Y to the desired value, in the various embodiments described below.

The wedge surface 5 is translatable in the first direction X-X together with the jaws 2.

This applies either in the case of wedge surfaces 5 made in the jaws 2 themselves, or in the case of wedge elements fixed to the jaws 2, or positioned in the seat so as to be pressed in the first direction X-X by at least one jaw 2 during the clamping of the jaws 2.

The pressure in the second direction Y-Y is present at least in the assembled condition, i.e., when the terminals 111 are present in the seat. Such a pressure in the second direction Y-Y acts right on the terminals 111, directly or indirectly.

In particular, the pressure in the second direction Y-Y is transmitted at least on the contact surfaces 112 of each terminal 111. This can be a pressure of direct contact between the contact surfaces between the two terminals 111. Alternatively, when a spacing block 3 is included, the pressure in the second direction Y-Y can be a contact pressure between each abutment surface 31 of the spacing block 3 and the contact surface 112 of a relative terminal 111.

Concurrently with this pressure between the contact surfaces 112, or between them and the abutment surfaces 31, a pressure in the second direction Y-Y between the terminals 111 and the side elements 22 is also preferably provided, as will be discussed.

In order to convert the pressure from the first to the second direction X-X, Y-Y, each wedge surface 5 is in contact with a respective receiving surface.

In some embodiments, the receiving surface is another of the wedge surfaces 5, complementary to that considered.

In other embodiments, the receiving surface may not be wedge shaped, but include for example an edge on which the wedge surface 5 acts.

Figure 6:
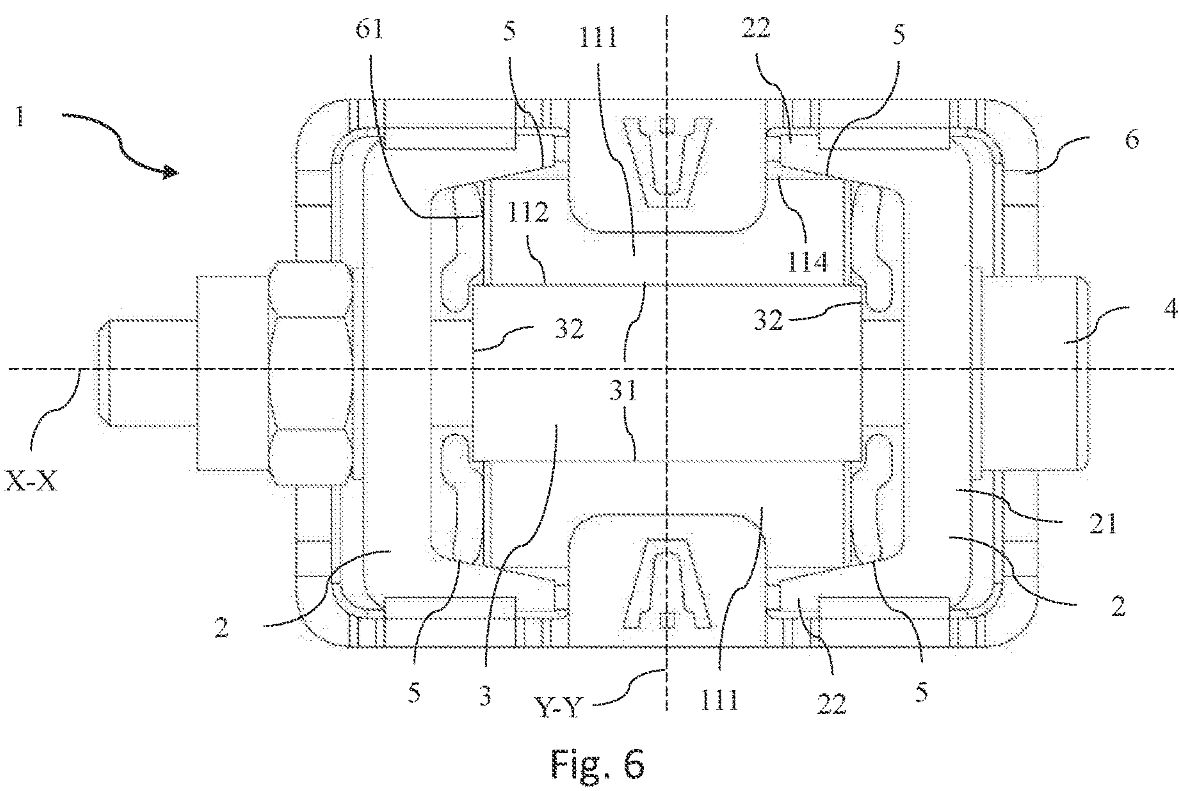
FIG. 6 shows a top view of the coupling devices of FIG. 3, assembled on a pair of terminals.

For example, the receiving surface can be an edge of one of the terminals 111. FIGS. 3, 4 and 6 show details of a first embodiment of the invention, when designed for the connection of a single pair of terminals 111.

In accordance therewith, each wedge surface 5 is formed in a respective arm of a respective jaw 2, or in one of the side elements 22, as particularly visible in FIG. 6. More precisely, both jaws are U-shaped. Furthermore, each arm of each jaw 2 has a wedge surface 5.

In such an example, the receiving surface, relating to each wedge surface 5, is given by at least one part of that face 114, of a respective terminal 111, which is opposite the contact surface 112. Precisely, the receiving surface is given by an edge of the face 114.

By virtue of this arrangement, each terminal 111 is compressed between two wedge surfaces 5 of two distinct jaws 2, which act at opposite edges of the face 114 of the terminal 111 opposite the contact surface 112. Accordingly, each terminal 111 translates in the second direction Y-Y toward the opposite terminal 111, until reaching the desired compression condition in the second direction Y-Y.

It should be noted that in this embodiment the pressure in the second direction Y-Y is a pressure for mutual approach of the terminals 111. Pressures of mutual approach can also be obtained with alternative arrangements of the wedge surfaces 5, not necessarily formed directly in the jaws 2.

In general, however, they are obtained when at least one of the terminals 111 is interposed, considering the second direction Y-Y, between a wedge surface 5 and the opposite terminal 111. More in detail, at least one wedge surface 5 is arranged on a first side of the seat. All the electric terminals 111 present in the seat 111 are between such at least one wedge surface 5 and an opposite side element 22, which is on a second side of the seat, opposite the first side.

It should be noted that in these conditions each wedge surface 5 faces the interior of the seat.

The embodiment of FIGS. 3, 4 and 6 includes a spacing block 3. Therefore, the pressure for approaching the terminals 111 results in a pressure between the contact surfaces 112 of the terminals 111 and the respective abutment surfaces 31 of the spacing block 3, and also between the side elements 22 and the terminals 111.

In detail, when the terminals 111 are removed from the seat, each wedge surface 5 faces directly a respective abutment surface 31 of the spacing block 3 in the second direction Y-Y. However, the arrangement of the wedge surfaces 5 of FIG. 6 is also suitable for the case in which there is no spacing block 3, with obvious dimensional adaptations to reduce the size of the seat. The pressure for approaching the terminals 111 results in such a case into a pressure of direct contact between the contact surfaces 112 of the terminals 111.

One of the possible asymmetric variants of this embodiment can provide for example that on one side of the seat there are one or two side elements 22 each represented by an arm of a jaw 2, with a wedge surface 5, while on the opposite side of the seat the side element 22 is distinguished from the jaws 22 and is simply kept in a fixed position, free of wedge surfaces 5.

Figure 7:
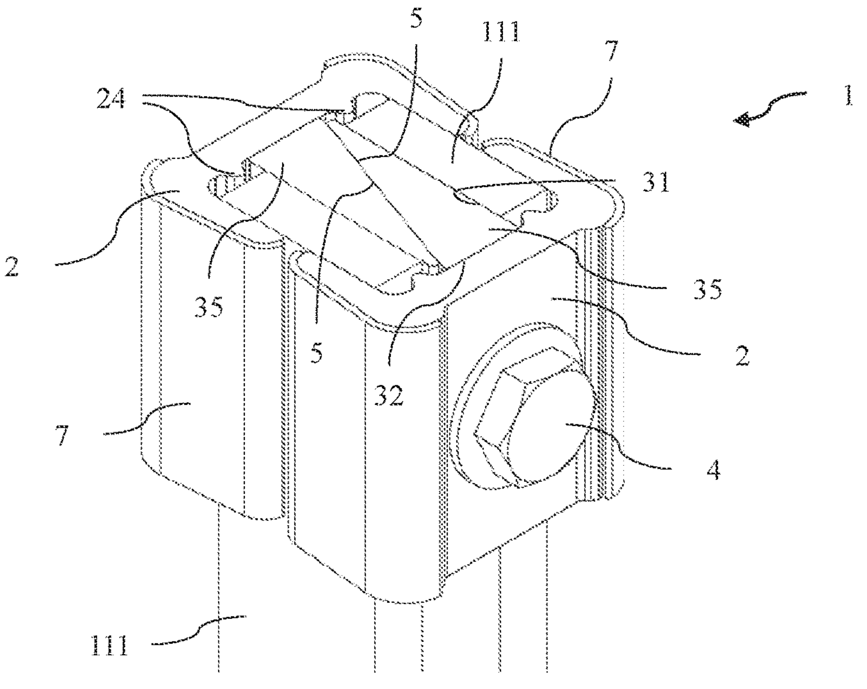
FIG. 7 shows a perspective view of a different embodiment of a coupling device for tab electric terminals according to the invention, assembled on a pair of terminals.

A second embodiment of the invention is shown in FIG. 7. It envisages that the spacing block 3 comprises two distinct and cooperating spacing bodies 35.

Each spacing body 35 has one of the two abutment surfaces 31 of the spacing block 3. Furthermore, each spacing body 35 has one of the two secondary surfaces 32 of the spacing block 3. In addition, each spacing body 35 has its own wedge surface 5. The wedge surfaces 5 of the two spacing bodies 35 are complementary and cooperating with each other, i.e., one acts as a receiving surface for the other.

Essentially, the two spacing bodies 35 are obtainable by dividing the spacing block 3 into two parts, along an ideal diagonal surface of the spacing block 3, which originates the two wedge surfaces 5.

The secondary surface 32 of each spacing body 35 is in contact with the base 21 of a respective jaw 2. Thus, during the clamping of the jaws 2, each jaw 2 presses the secondary surface 32 of one of the spacing bodies 35 in the first direction X-X. Therefore, the joint translation in the first direction X-X of the spacing bodies 35 together with the respective jaws 2 is achieved.

During this translation in the first direction X-X, the wedge surfaces 5 of the two spacing bodies 35 are pressed against each other, so as to slide on each other. In fact, each spacing body 35 is compressed between one of the jaws 2 and the opposite spacing body 35.

Due to this mutual sliding of the wedge surfaces 5, the translation of each spacing body 35 in the first direction X-X, together with the respective jaw 2, is concomitant with a translation of the spacing body 35 in the second direction Y-Y with respect to the respective jaw 2. In other words, there is also a sliding in the second direction Y-Y of the secondary surface 32 of the spacing body 35 along the base 21 of the jaw 2.

As can be seen in FIG. 7, the base 21 of each jaw 2 can have protrusions 24, placed on the sides of each spacing body 35. The protrusions 24 limit the movement of the spacing bodies 35 in the second direction Y-Y.

It should also be noted that, if the stem 41 of the clamping element 4 passes through a clamping hole 33 of the spacing block 3, such a clamping hole 33 can extend through both spacing bodies 35. Similarly, each spacing body 35 can have its own connection hole 34.

In view of the necessity of the spacing bodies 35 to slide in the second direction Y-Y with respect to the jaws 2, each of the parts of the clamping hole 33 extending into one of the spacing bodies 35 is elongated in the second direction Y-Y, being shaped for example like a clamping slot. As an alternative to the elongation in the second direction Y-Y, the clamping hole 33 can simply have a larger diameter than the stem 41 of the clamping element 4, in order to allow some backlash to the stem 41.

With the arrangement of the wedge surfaces 5 described for FIG. 7, it is obtained that, during the clamping of the jaws 2, the two spacing bodies 35, sliding in the second direction Y-Y, are each pressed against the adjacent terminal 111. A pressure is thus obtained in the second direction Y-Y which is a pressure for mutually distancing the terminals 111, and is exerted by the abutment surfaces 31 of the spacing bodies 35 on the contact surfaces 112 of the respective terminals 111.

This pressure, while being in a direction of mutual distancing of the terminals 111, improves the electrical contact therebetween. In fact, there is significant pressure both between each contact surface 112 and each respective abutment surface 31, to exchange current between the terminals 111 and the spacing block 3, and between the wedge surfaces 5, to exchange current between the two spacing bodies 35 of the spacing block 3.

It should be noted that the side elements 22 prevent the terminals 111 from moving excessively away in the second direction Y-Y, and thus from loosening the contact pressure. Therefore, with the clamping of the jaws 2, each terminal 111 is compressed in the second direction Y-Y between one of the spacing bodies 35, on the one hand, and side elements 22, for example a pair of arms of distinct jaws 2, on the other.

Figures 8, 9A:
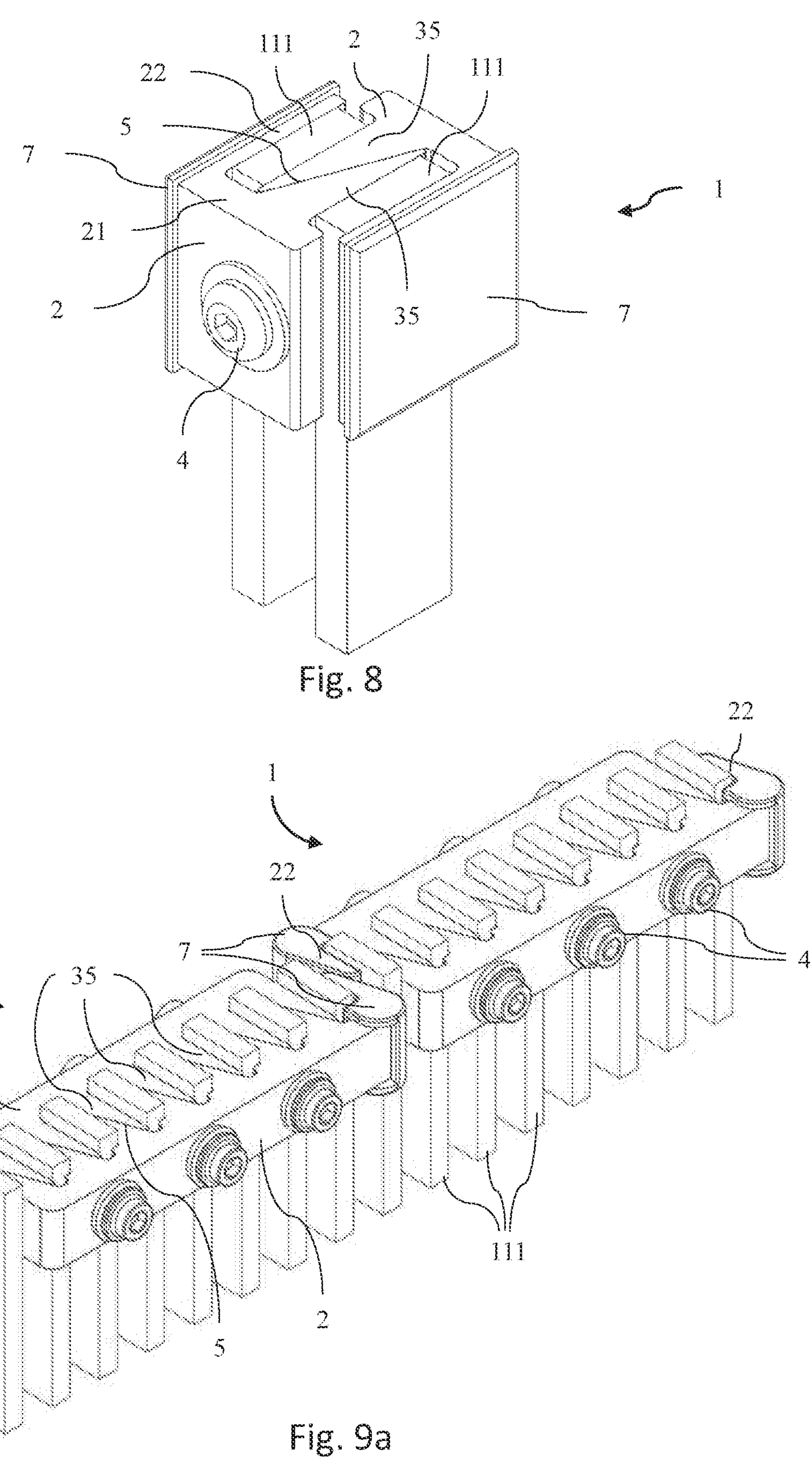
FIG. 8 shows a perspective view of another embodiment of a coupling device according to the invention, assembled on a pair of terminals.
FIGS. 9*a*, 9*b* show perspective and top views of two coupling devices according to still another embodiment of the invention, each assembled on numerous terminals.

FIG. 8 shows a third embodiment, similar to that of FIG. 7. However, the jaws 2 are not U-shaped, but L-shaped. Furthermore, the spacing block 3 is always composed of two spacing bodies 35 with the wedge surfaces 5, but these are each integrally formed with a respective jaw 2. Precisely, each spacing body 35 protrudes from the base 21 of a respective jaw 2 at least in part in the first direction X-X, towards the base 21 of the opposite jaw 2.

In such a case, the spacing bodies 35 do not have secondary surfaces 32.

During the clamping, the spacing bodies 35, as well as the entire jaws 2, translate partially in the first direction X-X and partially in the second direction Y-Y. The clamping holes 23, 33 of the jaws 2 and of the respective spacing bodies 35 are coincident. They allow a clearance in the second direction Y-Y of the stem 41.

In the preferred embodiments, the device 1 is completed by a casing 6, made of electrically insulating material. The casing 6 encloses the jaws 2, and preferably also the side elements 22 (which can be part of the jaws 2), as well as any other component arranged in the seat therebetween. In some of the illustrated embodiments (FIGS. 7, 8, 9*a*, 9*b*), there is no casing 6 enclosing the jaws 2, but optionally other types of insulating coatings 7, positioned in particular so as to allow several devices 1 to be placed side by side along the first direction X-X, avoiding electrical contacts between the jaws 2.

Where present, the casing 6 comprises support elements, shaped to support at least the jaws 2 and keep them in the correct position, still allowing the described movements which occur during the clamping.

If the side elements 22 are not directly connected to the jaws 2, they can also be supported and maintained in position always by the support elements of the casing 6. Therefore, the casing 6 can form an example of indirect connection between each side element 22 and at least one of the jaws 2, and/or between the two side elements 22.

Alternatively, the side elements 22 can be connected to the clamping element 4, or to the spacing block 3.

This function of holding the side elements 22 in place prevents, for example, the distancing pressures of the terminals 111 from causing a retraction of the side elements 22, causing a worsening of the electrical connection. This is of course not required by the casing 6 if the side elements 22 are arms of the jaws 2.

It should be noted that based on the type of connection chosen, the side elements 22 can be substantially fixed to, or they can translate together with, the jaws 2 during the clamping thereof. The support elements of the casing 6 can also be shaped to support and hold in place one or more of the spacing blocks 3.

Preferably, the clamping element 4 emerges at least in part from the casing 6, so that it can be clamped without removing the casing 6. In particular, the head 42 of the screw and the nut 43 both emerge from the casing 6.

The casing 6 has at least one opening 61 for inserting and extracting the terminals 111 into/from the seat. In the illustrated embodiment there is a further opening 62, for accessing the inner components from above, opposite the opening 61.

By virtue of the casing, the coupling device 1 is more easily handled, by a user or automated machinery responsible for fitting the coupling device on a pair of terminals 111, in order to introduce the terminals 111 into the seat and couple the terminals 111 to each other.

In particular, various parts of the casing 6 can be shaped to guide, during the assembly of the device 1, the jaws 2 and various other components in the correct position, as well as to guide the terminals 111 in the seat. Thus the implementation of the coupling device 1 is also simplified. The guides and the support elements of the casing also allow the correct positioning of components which are slightly different from each other due to machining tolerances.

Figure 9B:
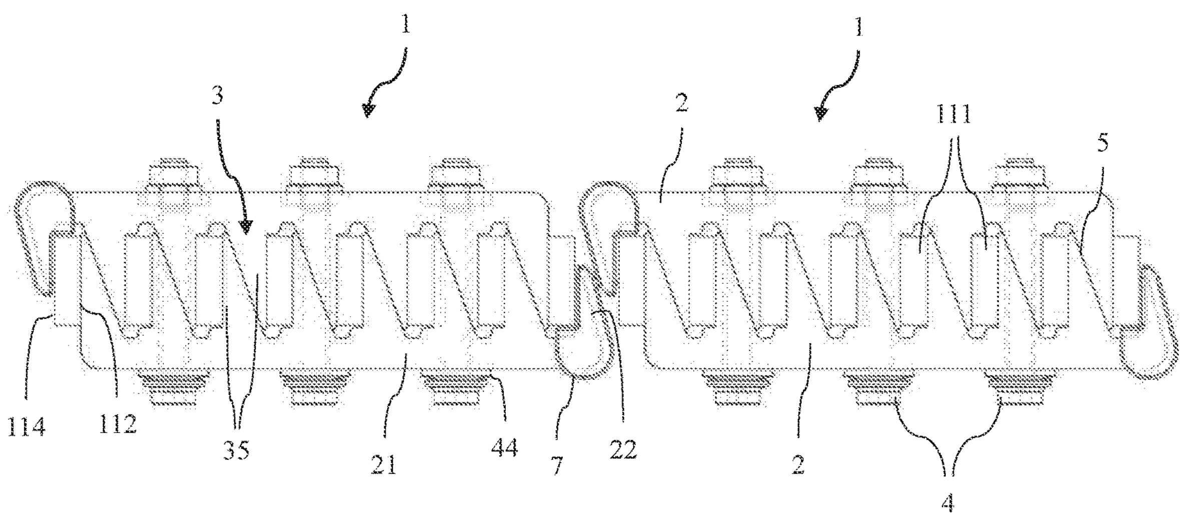

FIGS. 9*a*, 9*b* show examples of a pair of coupling devices 1, according to a fourth embodiment, each of which couples more than two terminals 111 simultaneously, in particular eight terminals 111 each. Seven spacing blocks 35 divide the seat into eight compartments for the respective terminals 111.

Those skilled in the art will understand that this can be useful for example for connecting in series two groups of cells 110, and in particular a first group of four cells 110, for which a terminal 111 of a first polarity is connected, and a second group of four cells 110, for which a terminal 111 of a second polarity is connected. However, there are no a priori limits on the type of polarity of the terminals 111 to be connected, as well as on their positioning in series or in parallel. Otherwise, this embodiment is similar to that of FIG. 8, in that each spacing block 3 consists of two spacing bodies 35 formed in a single piece with respective jaws 2. The blocks and the spacing bodies 3, 35 are spaced from each other in the second direction Y-Y. Each jaw 2 is thus comb-shaped.

Some of the terminals 111, with the clamping of the jaws 2, are compressed between two abutment surfaces 31 of distinct spacing bodies 35. Other terminals 111 are compressed between an abutment surface 31 of a spacing body 35, and one of the side elements 22.

A single arm of one jaw 2 on one side and a single arm of the other jaw 2 on the other side are included as side elements 22.

For greater structural stability, not a unique clamping element 4 is provided, but a plurality of clamping elements 4, in particular three.

Figure 10:
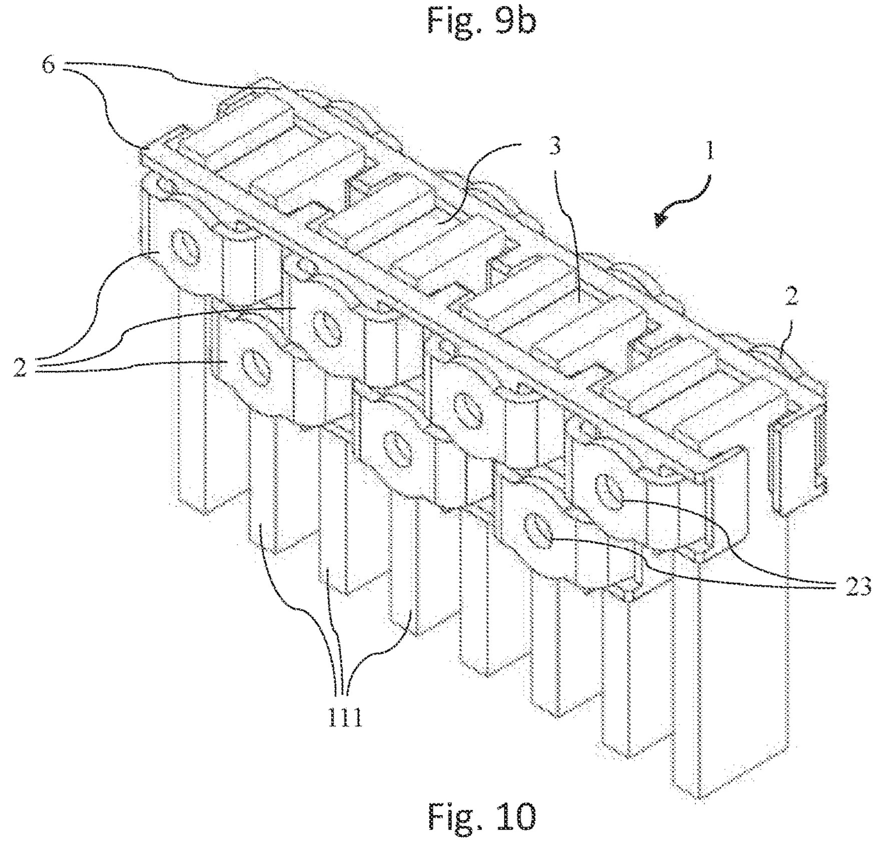
FIG. 10 shows a perspective view of a coupling device according to yet another embodiment of the invention, assembled on numerous terminals.

FIG. 10 shows a fifth embodiment which allows connecting more than two terminals 111. In this case, adjacent terminals 111 are connected two by two, substantially in the same manner as FIGS. 3, 4 and 6, in particular with wedge surfaces 5 formed in the jaw arms 2.

However, a single casing 6 (formed in two parts) of the device 1 does not enclose only one pair of jaws 2, but a plurality of independent pairs of jaws 2. The different pairs of jaws 2 are spaced apart at least partly in the second direction Y-Y.

To save space, some of the pairs of jaws 2 are also offset from each other in a third direction, perpendicular to the first and second directions X-X, Y-Y.

The clamping elements 4 have been omitted from this figure, but one is included for each pair of jaws 2, as understandable by the clamping holes 23 visible in the figure.

Figure 11A:
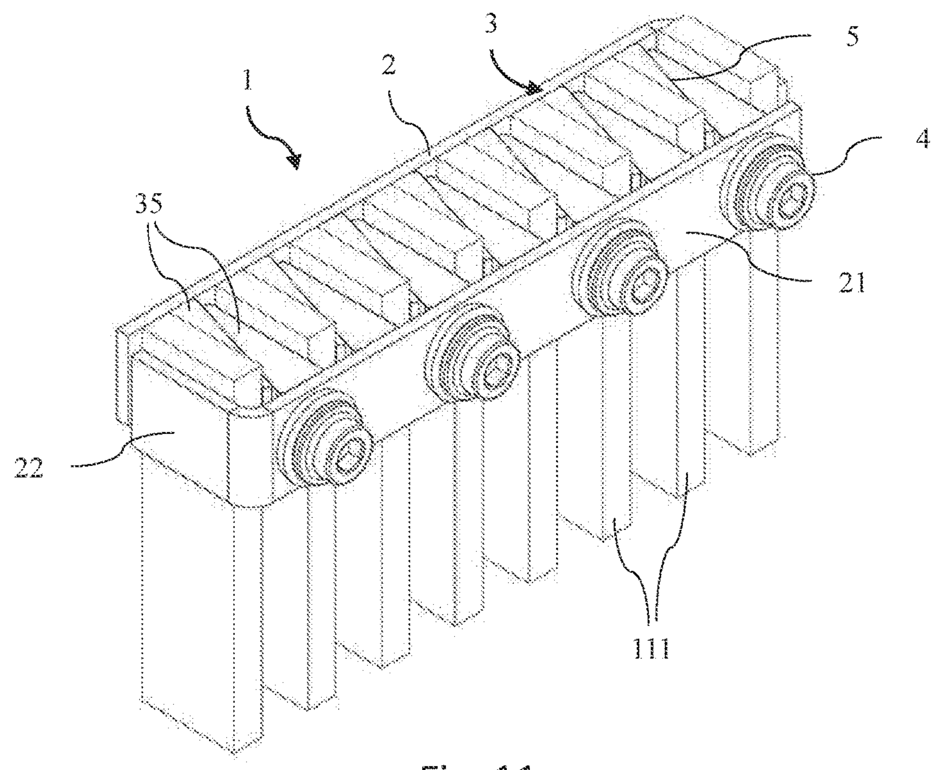
FIGS. 11*a*, 11*b* show perspective and top views of a coupling device according to still another embodiment of the invention, assembled on numerous terminals.
Figure 11B:
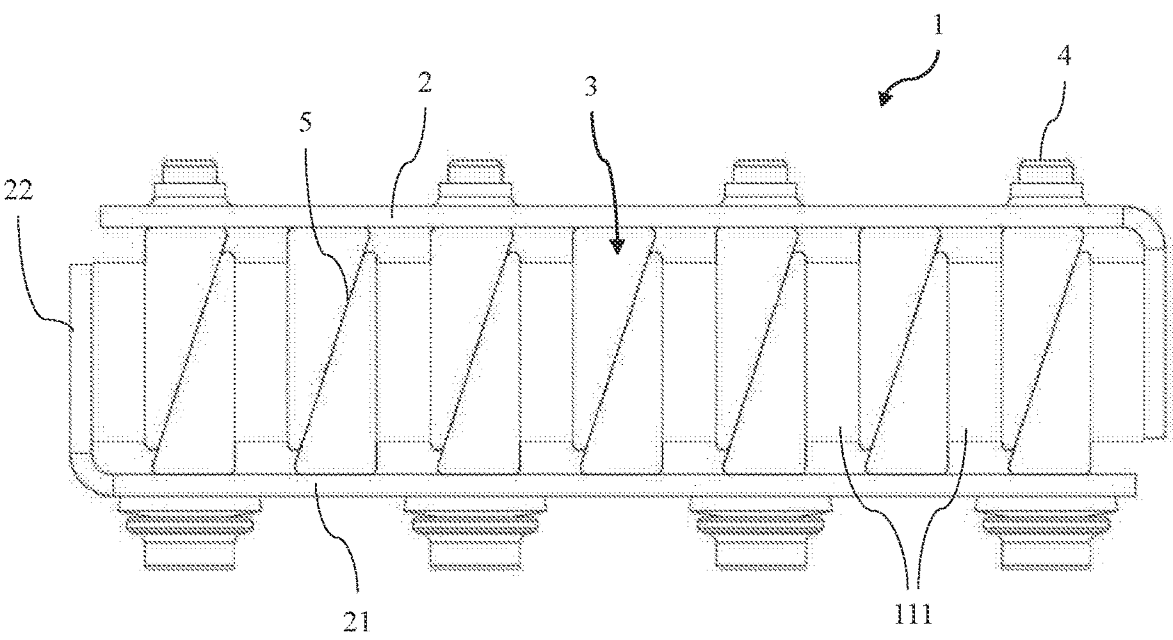

In FIGS. 11*a*, 11*b*, sixth embodiment, a single device 1 couples more than two terminals 111. This resembles the embodiment of FIG. 7, in that each spacing block 3 consists of two spacing bodies 35 which are not integrally formed with the jaws 2.

Each jaw 2 is L-shaped, with a single arm identifying a respective side element 22.

A casing 6 has not been illustrated, but is preferably included, in particular for the support of at least those spacing bodies 35 which are not crossed by any clamping element 4.

Figure 12:
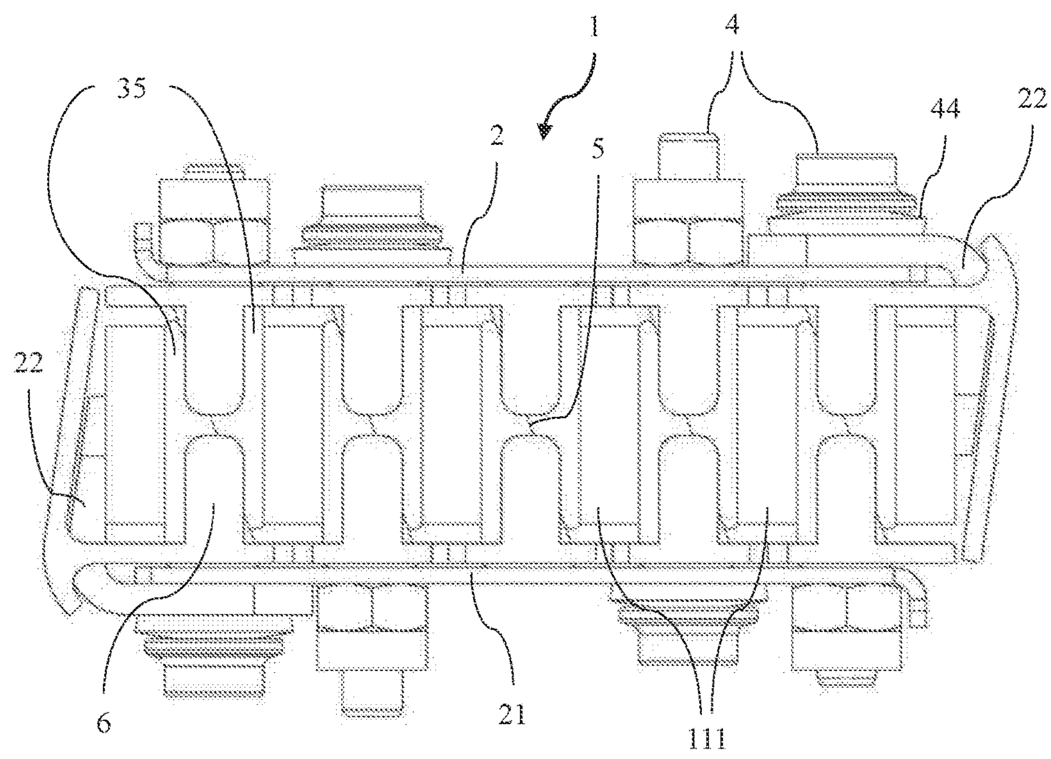
FIG. 12 shows a top view of a coupling device according to yet another embodiment of the invention, assembled on numerous terminals.

The seventh embodiment of FIG. 12 is similar to those of FIGS. 11*a*-11*b*. In fact, the wedge surfaces 5 are formed in distinct spacing bodies 35 separated from the jaws 2. However, in this embodiment the casing 6 is depicted, which supports the spacing bodies 35.

Furthermore, the side elements 22 are not integrally formed with the jaws 2, but are separate elements mounted on respective clamping elements 4. Precisely, exactly two side elements 22 are included.

Each side element 22 is then held integral with a respective jaw 2 by at least one of the clamping elements 4. For this purpose, each side element 22 is provided with its own clamping hole (not shown) aligned with a clamping hole 23 of a jaw 2.

It should be noted that the conical washers 44, as illustrated, may not directly lie on the jaws 2, but for example on the side elements 22.

Figure 13:
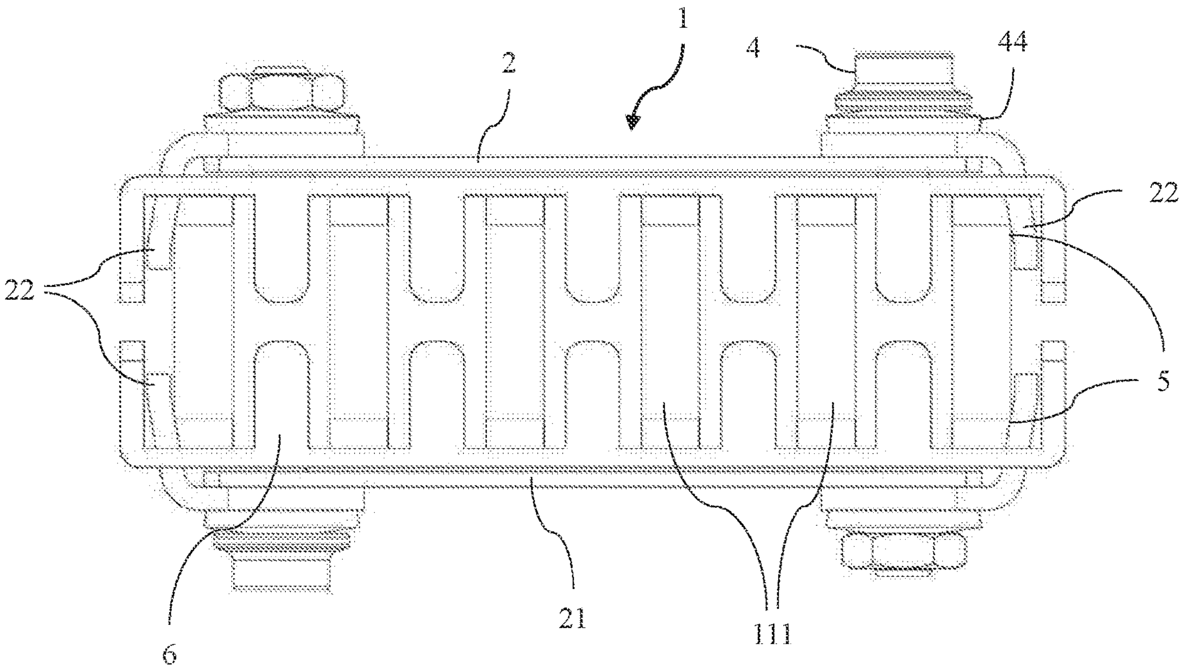
FIG. 13 shows a top view of a coupling device according to yet another embodiment of the invention, assembled on numerous terminals.

The eighth embodiment, in FIG. 13, is similar to that of FIG. 12, for the presence of side elements 22 which are distinct from the jaws 2. However in this embodiment, there are four side elements 22, and not two. Furthermore, the wedge surfaces 5 are formed in the side elements 22, and not in spacing bodies 35. In particular, for this embodiment it is not envisaged that the spacing blocks 3 are each divided into distinct spacing bodies 35. However, they are always supported by the casing 6, at least where they are not already supported by the clamping elements 4.

Obviously, those skilled in the art will be able to make numerous equivalent changes to the above-mentioned variants, without thereby departing from the scope of protection defined by the united claims.

The invention claimed is:

1. Coupling device for coupling two or more tab electric terminals, comprising:

a pair of jaws spaced apart from each other in a first direction, each jaw having a base with two end portions, the bases of the jaws delimiting in the first direction a seat therebetween, the seat being adapted to receive therein two or more tab electric terminals, so that respective electrical contact surfaces of the terminals face each other in a second direction, transverse to the first direction, at least one clamping element configured to clamp the jaws towards each other in the first direction, side elements spaced apart from each other in the second direction to delimit the seat in the second direction, each side element being an arm of a respective jaw, connected to an end portion of the base of the respective jaw, or each side element being distinct from the jaws and connected at least indirectly to a respective jaw so as to translate in the first direction together with said jaw during the clamping of the jaws, at least one electrically conductive spacing block, arranged in the seat so as to be placed between the terminals, when they are present in the seat, the spacing block having two opposite abutment surfaces, each arranged so as to face a respective contact surface of a respective terminal, when it is present in the seat, wherein at least one of the side elements has a wedge surface, that is inclined with respect to the first and the second direction, characterized in that said wedge surface is arranged and inclined so as to act on at least one terminal at a face of the terminal opposite the contact surface, and to convert a pressure in the first direction, exerted by clamping the pair of jaws, into a pressure for mutual approach of the terminals in the second direction, when they are present in the seat, so as to press in the second direction the contact surfaces of the terminals against the respective abutment surfaces of the spacing block.

2. Coupling device according to claim 1, wherein, when the terminals are removed from the seat, an at least one wedge surface directly faces in the second direction one of said abutment surfaces of the spacing block.

3. Coupling device according to claim 1, wherein the at least one wedge surface is oriented toward the interior of the seat.

4. Coupling device according to claim 1, wherein the at least one wedge surface is arranged on a first side of the seat, for enabling the seat to receive all of the two or more electric terminals between the at least one wedge surface and one opposite side element arranged on a second side of the seat, opposite to the first side.

5. Coupling device according to claim 1, wherein:

each jaw comprises at least one clamping hole, and the clamping element comprises a stem extending along the first direction through the clamping holes of the jaws.

6. Coupling device according to claim 5, wherein the spacing block has a clamping hole, the stem of the clamping element extending through the clamping hole of the spacing block.

7. Coupling device according to claim 5, wherein the side elements are each mounted on a respective clamping element, each side element having a clamping hole crossed by the stem of the respective clamping element.

8. Coupling device according to claim 5, wherein:

the clamping element comprises at least one among a head fixed to the stem and a threaded element screwable on the stem, the clamping element comprises at least one conical washer interposed between one of the jaws and said at least one among the head and the threaded element.

9. Coupling device according to claim 1, comprising connection elements, configured for the electrical connection with at least one external electrical device, the connection elements preferably being formed in the spacing block.

10. Coupling device according to claim 9, wherein the connection elements comprise at least one connection hole formed in the spacing block, adapted to receive a male connector of the external electrical device.

11. Coupling device according to claim 1, comprising an electrically insulating casing enclosing the jaws, the casing having support elements, shaped to support at least the jaws, and an opening for inserting the terminals into the seat.

12. Battery module comprising:

a plurality of battery cells, each cell having tab electric terminals, and at least one coupling device according to claim 1, wherein two or more terminals of distinct battery cells are coupled to each other by the coupling device.

* * * * *